United States Patent [19]
Norte

[11] Patent Number: 5,963,349
[45] Date of Patent: Oct. 5, 1999

[54] INEXPENSIVE SINGLE-FIBER BIDIRECTIONAL DATA LINK

[75] Inventor: David A. Norte, Westminster, Colo.

[73] Assignee: Lucent Technologies Inc., Murray Hill, N.J.

[21] Appl. No.: 08/790,773

[22] Filed: Jan. 27, 1997

[51] Int. Cl.⁶ .................................................. H04J 14/00
[52] U.S. Cl. ...................... 359/116; 359/127; 359/113; 359/152
[58] Field of Search .................... 359/113, 114, 359/116, 124, 127, 173, 152; 385/27

[56] References Cited

U.S. PATENT DOCUMENTS

| | | | |
|---|---|---|---|
| 4,287,606 | 9/1981 | Lutes, Jr. et al. | 359/173 |
| 4,300,811 | 11/1981 | Ettenberg et al. | 359/113 |
| 5,105,293 | 4/1992 | Bortolini | 359/154 |
| 5,278,687 | 1/1994 | Jannson et al. | 359/125 |
| 5,311,344 | 5/1994 | Bohn et al. | 359/113 |
| 5,418,869 | 5/1995 | Seike et al. | 359/113 |
| 5,528,407 | 6/1996 | Nakata et al. | 359/152 |

FOREIGN PATENT DOCUMENTS

| | | | |
|---|---|---|---|
| 0265918 | 5/1988 | European Pat. Off. | 359/113 |
| 3506715 | 8/1986 | United Kingdom | 359/113 |
| 2176363 | 12/1986 | United Kingdom | 359/113 |
| 2222735 | 3/1990 | United Kingdom | 359/113 |

OTHER PUBLICATIONS

F. S. Welsh, Lightwave Data Links and Interfaces, AT&T Technical Journal, vol. 66, Iss. 1, Jan./Feb. 1987, pp.65–72.
P. P. Bohn et al., Fiber In The Loop, AT&T Technical Journal, vol. 71, No. 1, Jan./Feb. 1992, pp. 31–45.
D. J. Wasser, Optical Datalinks, AT&T Technical Journal, vol. 71, No. 1, Jan./Feb. 1992, pp. 46–52.
M. H. Weik, Communications Standard Dictionary, Van Nostrand Reinhold Co., 1983.

*Primary Examiner*—Rafael Bacares
*Attorney, Agent, or Firm*—David Volejnicek

[57] ABSTRACT

An optical wavelength-division multiplexed bidirectional data link (FIG. 1) is constructed using a single multi-mode fiber (130). The link comprises the optical fiber with a single-lens optical transceiver (100, 150) at each end of the fiber. Each single-lens optical transceiver comprises a transmitter in the form of a surface-emitting light-emitting diode (LED 101) that emits light at a wavelength of 0.85 $\mu$m, and a receiver in the form of a large-scale optical detector (102) and a dielectric optical filter (103) that has a passband at a wavelength of 1.3 $\mu$m. In the other transceiver, the wavelengths of the transmitter and the receiver are reversed. The transceiver is made as a single integrated-circuit device and is coupled to the fiber by a single-lens optical coupler (110, 160). The optical coupler is a light pipe (112) that consists of the following: a first surface (114) along the length of the light pipe for positioning adjacent to the transceiver, a reflective planar second surface (111) at one end of the light pipe for positioning in front of the transceiver and forming a 45° angle with the first surface, and a convex lens (113) at the other end of the light pipe for optically coupling light into and out of the multimode fiber.

9 Claims, 1 Drawing Sheet

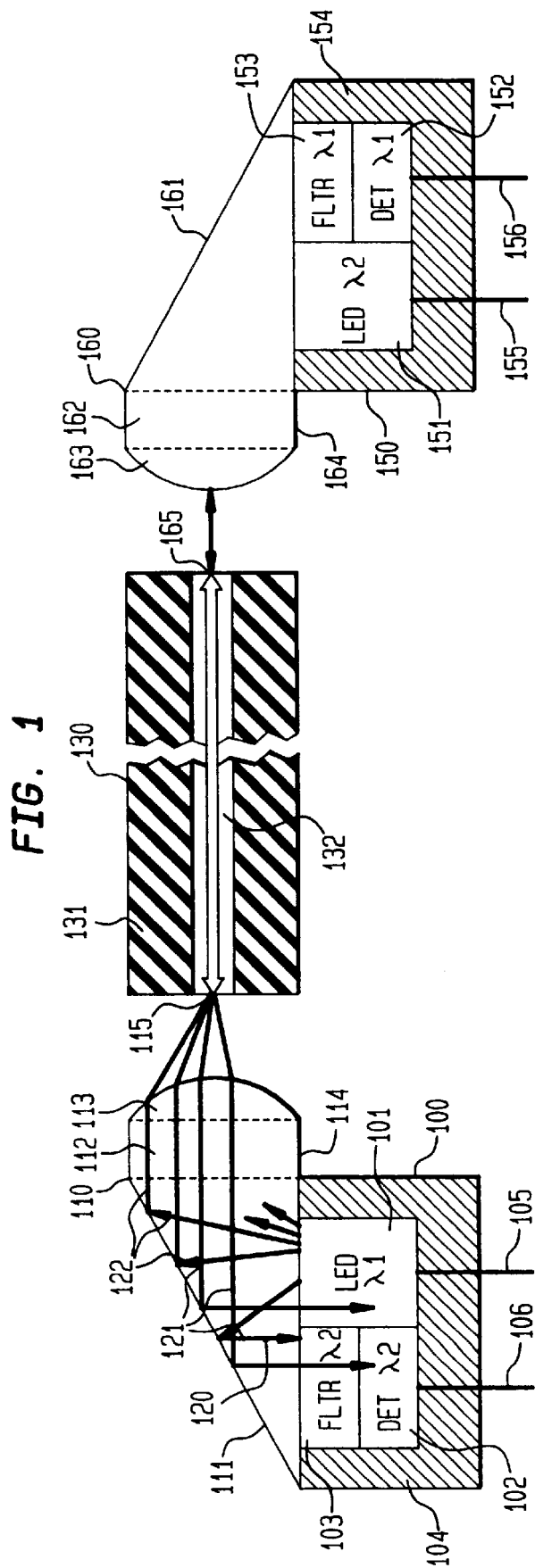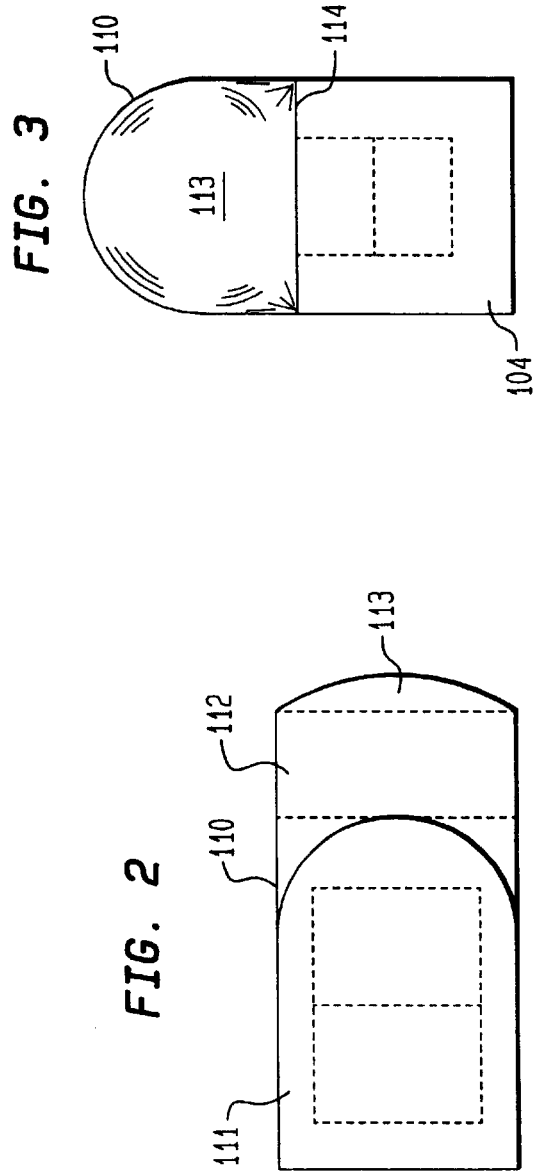

INEXPENSIVE SINGLE-FIBER BIDIRECTIONAL DATA LINK

TECHNICAL FIELD

This invention relates to optical transmission systems.

BACKGROUND OF THE INVENTION

In the rapidly-expanding market for office communications, computer interconnections, local area networks, and factory automation—to name a few examples—fiber-optic point-to-point data links offer a cost-effective and functionally superior alternative to copper interconnections. Multimode fiber-optic data links are intended for applications in which distances are relatively short (up to a few kilometers in length), and where cost, size, and reliability are paramount. Such requirements are characteristic of local area networks or campus computing facilities, where moderate amounts of information are transmitted among several locations. This is in contrast to the long-haul transmission market, which involves extremely high capacity and long distances. As a result of the different requirements, short-haul data links generally use low-cost light-emitting diode (LED) sources, multimode fiber, and simple junction photodetectors. In contrast, long-haul applications use semiconductor lasers, single-mode fiber, and more complex receivers.

Single-mode fiber transmission systems often use one fiber and some form of optical or electronic bidirectionality to achieve bidirectional communications. In contrast, bidirectional communications via short-haul data links are presently effected through the use of a pair of multimode fibers, one for each direction of transmission. Most commonly, identical LED transmitters are used with both fibers, so that both fibers transport light of the same wavelength. The wavelengths that are commonly used are either the 0.87 $\mu$m wavelength radiation emitted by gallium aluminum arsenide (GaAlAs) diodes or the 1.31 $\mu$m wavelength radiation emitted by indium gallium arsenide phosphide (InGaAsP) diodes.

The components and the operation of single-mode fiber transmission systems are expensive; in contrast, those of the multi-mode data links are relatively inexpensive. However, some of this cost benefit of short-haul data links is offset by the need for two data links to construct a bidirectional communications system. It would be advantageous if this benefit offset could be avoided.

SUMMARY OF THE INVENTION

This invention is directed to meeting these and other needs and overcoming disadvantages of the prior art. Generally according to the invention, an optical bidirectional data link is constructed using a single wavelength-division multiplexed multi-mode fiber. Such a link comprises a multimode fiber, and a first and a second optical transceiver. The first optical transceiver includes a first light-emitting diode (LED) generating light at a first wavelength (e.g., 0.85 $\mu$m) which is optically coupled to a first end of the fiber, and a first optical detector detecting light at a second wavelength (e.g., 1.3 $\mu$m) different from the first wavelength and which has the first end of the fiber optically coupled thereto. The second optical transceiver includes a second LED generating light at the second wavelength which is optically coupled to a second end of the fiber, and a second optical detector detecting light at the first wavelength and which has the second end of the fiber optically coupled thereto.

Because it uses only a single fiber, the optical bidirectional data link constructed according to the invention avoids the benefit offset vis-a-vis single-mode transmission systems experienced by conventional short-haul data links. And because it can use the inexpensive components that are already employed by multi-mode transmission technology, the invention reinforces the cost advantage that multi-mode systems have over single-mode systems. Since it uses conventional multimode fiber, the invention can be retrofitted into existing multimode transmission systems to immediately double their data-carrying capacity. And in new data-link installations, the invention can be used to cut the cost of each data link substantially in half.

According to another aspect of the invention, an optical transceiver for an optical bidirectional data link having a single multi-mode fiber comprises an LED for generating light having a first wavelength and transmitting the generated light into the fiber, and an optical detector for detecting light received from the fiber and having a second wavelength different from the first wavelength. This transceiver is preferably manufactured as a single integrated-circuit device, thereby providing a small and inexpensive transceiver that is easy to install in a circuit pack.

According to a further aspect of the invention, an optical coupler is used for coupling an optical transceiver to a multi-mode fiber in an optical bidirectional data link, and this optical coupler comprises a light pipe that defines a first surface along its length for positioning adjacent to an emitting portion of an LED and a detecting portion of an optical detector of the optical transceiver, defines at one end a reflective second surface for positioning in front of the emitting portion of the LED and the detecting portion of the optical detector and forming a substantially 45° angle with the first surface, and defines at the other end a lens for optically coupling the emitted/detected light to/from an end of the multi-mode fiber. A simple single-lens optical coupler that is relatively inexpensive and easy to make and install is thus employed to couple both the transmitter and the receiver of the optical transceiver to the multi-mode fiber.

These and other advantages and features of the invention will become more apparent from the following description of an illustrative embodiment of the invention taken together with the drawing.

BRIEF DESCRIPTION OF THE DRAWING

FIG. 1 is a cross-section view of an optical bidirectional data link that embodies an illustrative implementation of the invention;

FIG. 2 is a top view of an optical coupler and a transceiver of the data link of FIG. 1; and FIG. 3 is a front view of the optical coupler and transceiver of FIG. 2.

DETAILED DESCRIPTION

FIG. 1 shows a single-fiber bidirectional data link in cross-section. The data link comprises a single multimode optical fiber 130, a pair of optical transceivers 100, 150, and a pair of optical couplers 111, 161 each one of which couples one of the transceivers 100, 150 to a different end of fiber 130. Optical fiber 130 conventionally comprises a core 132 surrounded by a cladding 131. Transceiver 100 comprises an optical transmitter in the form of a surface-emitting light-emitting diode (LED) 101 that emits radiation having wavelengths around 0.85 $\mu$m, and an optical receiver in the form of a large-scale (e.g., at least about 1 mm$^2$) optical detector diode 102 and a dielectric optical filter 103 that has an optical pass band at wavelengths around 1.3 μm and blocks wavelengths around 0.85 μm. Conversely, transceiver 150 comprises an optical transmitter in the form of a surface-emitting LED 151 that emits radiation having wavelengths around 1.3 μm, and an optical receiver in the form of a large-scale optical detector diode 152 and a dielectric optical filter 153 that has an optical passband at wavelengths around 0.85 μm and blocks wavelengths around 1.3 μm. Consequently, multimode fiber 130 is wavelength-division multiplexed and its core 132 carries light having wavelengths around 0.85 μm and around 1.3 μm in opposite directions. The range of wavelengths emitted by LED 101 is about 100 nm, and the range of wavelengths emitted by LED 151 is about 110 nm. This results in about 350 nm of separation between the two lightwave spectra being conducted by fiber 130 in opposite directions, which ensures that the two spectra do not interfere with each other.

LEDs 101, 151, detectors 102, 152, and filters 103, 153 may be separate discrete components. Preferably, however, for ease and low cost of manufacturing and assembly and for minimizing circuit pack "real estate" occupied by the transceivers, transceivers 100 and 150 are each fabricated as an integrated device on a common substrate 104, 154, respectively, by conventional integrated circuit (IC) fabrication processes. Electrical connections to transceivers 100 and 150 are made via leads 105–106 and 155–156, respectively. These leads also serve to mount transceivers 100 and 150 onto printed-circuit wiring boards. Both surface mounting and through-hole mounting is envisioned.

Each transceiver 100, 150 is optically coupled to multimode fiber 130 by its own optical coupler 110, 160. Optical coupler 110 is a glass rod that is substantially semi-circular along its length (i.e., in cross-section), as can be seen in FIG. 3. Its flat side 114 is positioned over (e.g., glued to) filter 103 and the emitting surface of LED 101. The end of the glass rod that lies above filter 103, and LED 101 is cut flat at an angle of 45° from flat side 114, as can be seen in FIG. 2, to form a planar light-reflective surface 111 that reflects light 122 emitted by LED 101 into the body of the glass rod which acts as a light pipe 112, and that reflects light 121 from light pipe 112 to filter 103 and therethrough to detector 102. Any light 120 emitted by LED 101 that is reflected by surface 111 to filter 103 is blocked by filter 103 from reaching detector 102, thereby ensuring that emissions of the local transmitter will not interfere with local detection of remote transmissions. The other end of the glass rod of optical coupler 110 forms a convex lens 113 that faces an end of multimode fiber 130 which is positioned at the focal point 115 of the lens 113. Illustratively, lens 113 is formed by the conventional process of arcing (melting) the end of the glass rod. Lens 113 focuses light 122 emitted by LED 101 and arriving through light pipe 112 onto core 131 of fiber 130, and collimates light 121 emanating from fiber 130 into light pipe 112 for transmission to its detector 102.

Optical coupler 160 is identical to optical coupler 110 and comprises a semi-circular glass rod having a flat surface 164, a reflective surface 161, a light pipe 162, and a convex lens 163 with a focal point 165 at which is positioned the other end of fiber 130.

Present-day state-of-the-art LEDs are high-powered devices that can generate about 14 mW of power, or about 11.5 dBm. Coupling losses between transceivers 100 and 150 and fiber 130 are about 6 dB at each end. Losses in fiber 130 are about 2 dB/km in the worst case (at 0.85 μm wavelength). Losses due to only a fraction of the received light being projected by a surface 111, 161 onto a detector 102, 152 are estimated to be about 12 dB (assuming that the detecting surface area of a detector 102, 152 is about ¹⁄₁₆th of the surface area of reflecting surface 111, 161). Assuming a length of 3 km for fiber 130, detector 102, 152 sees an optical power of (11.5 dBm - 6 dB - 6 dB - 6 dB - 12 dB), or –18.5 dBm. Since typical photodetector sensitivity is about –30 dBm, this provides a more-than-adequate safety margin of about 11.5 dB for effective signal detection by detectors 102 and 152.

Of course, various changes and modifications to the described illustrative embodiment will be apparent to those skilled in the art. For example, light of wavelength other than 0.85 μm or 1.3 μm may be used—most notably wavelengths of 1.55 μm, which have the benefit of low attenuation during fiber transmission, although 1.5 μm LEDs are presently relatively expensive. Also, the multimode fiber can be either step-index or graded-index type of fiber, with the step-index fiber being used for very short distances up to about 2 km, and the graded-index fiber being used for longer distances up to about 20 km. Furthermore, for extremely short distances, up to about 100 m, plastic fiber can be used, with optical sources operating at wavelength of 650 nm and 850 nm. Such changes and modifications can be made without departing from the spirit and the scope of the invention and without diminishing its attendant advantages. It is therefore intended that such changes and modifications be covered by the following claims.

The invention claimed is:

1. An optical bidirectional data link comprising:

a multi-mode fiber;

a first optical transceiver comprising a first light-emitting diode (LED) generating light having a first wavelength optically coupled to a first end of the fiber, and a first optical detector detecting light having a second wavelength different from the first wavelength optically coupled to the first end of the fiber;

a second optical transceiver comprising a second LED generating light having the second wavelength optically coupled to a second end of the fiber, and a second optical detector detecting light having the first wavelength optically coupled to the second end of the fiber;

a first optical coupler for optically coupling the first LED and the first optical detector to the first end of the fiber; and a second optical coupler for optically coupling the second LED and the second optical detector to the second end of the fiber; wherein each optical coupler comprises a light pipe defining a first surface along its length positioned adjacent to an emitting portion of the corresponding LED and a detecting portion of the corresponding optical detector, defining at one end a reflective second surface positioned in front of the emitting portion of the corresponding LED and the detecting portion of the corresponding optical detector and forming a substantially 45° angle with the first surface, and defining at another end a lens for optically coupling the optical coupler to the respective end of the optical fiber.

2. The data link of claim 1 wherein:

the first wavelength is about 0.85 μm; and the second wavelength is about 1.3 μm.

3. The data link of claim 1 wherein:

each optical detector comprises an optical detection device for detecting light impinging upon the optical detection device, and an optical filter positioned in a path of the impinging light and having an optical passband at the wavelength of light that is to be detected by the optical detection device.

4. The data link of claim 3 wherein each optical transceiver is a single integrated-circuit device.

5. An optical transceiver for an optical bidirectional data link having a single multi-mode fiber, comprising:

a light-emitting diode for generating light having a first wavelength and transmitting the generated light into the fiber;

an optical detector for detecting light received from the fiber and having a second wavelength different from the first wavelength; and a light pipe defining a first surface along its length for positioning adjacent to an emitting portion of a light-emitting diode (LED) and a detecting portion of an optical detector of the optical transceiver, defining at one end a reflective second surface for positioning in front of the emitting portion of the LED and the detecting portion of the optical detector and forming a substantially 45° angle with the first surface, and defining at another end a lens for optically coupling the optical coupler to an end of the multi-mode fiber.

6. The transceiver of claim 5 wherein:

the transceiver is a single integrated-circuit device.

7. The transceiver of claim 6 wherein:

the optical detector comprises an optical detection element for detecting light impinging upon the element, and an optical filter positioned in a path of the impinging light and having an optical passband at the second wavelength.

8. The transceiver of claim 7 wherein:

one of the first and the second wavelengths is about 0.85 µm; and another of the first and the second wavelengths is about 1.3 µm.

9. An optical coupler for coupling an optical transceiver to a multi-mode fiber in an optical bidirectional data link, comprising:

a light pipe defining a first surface along its length for positioning adjacent to an emitting portion of a light-emitting diode (LED) and a detecting portion of an optical detector of the optical transceiver, defining at one end a reflective second surface for positioning in front of the emitting portion of the LED and the detecting portion of the optical detector and forming a substantially 45° angle with the first surface, and defining at another end a lens for optically coupling the optical coupler to an end of the multi-mode fiber.

* * * * *